Jan. 19, 1960     E. J. HELM     2,921,837
PRODUCTION OF DIAMMONIUM PHOSPHATE FROM COKE OVEN GAS
Filed Feb. 21, 1957
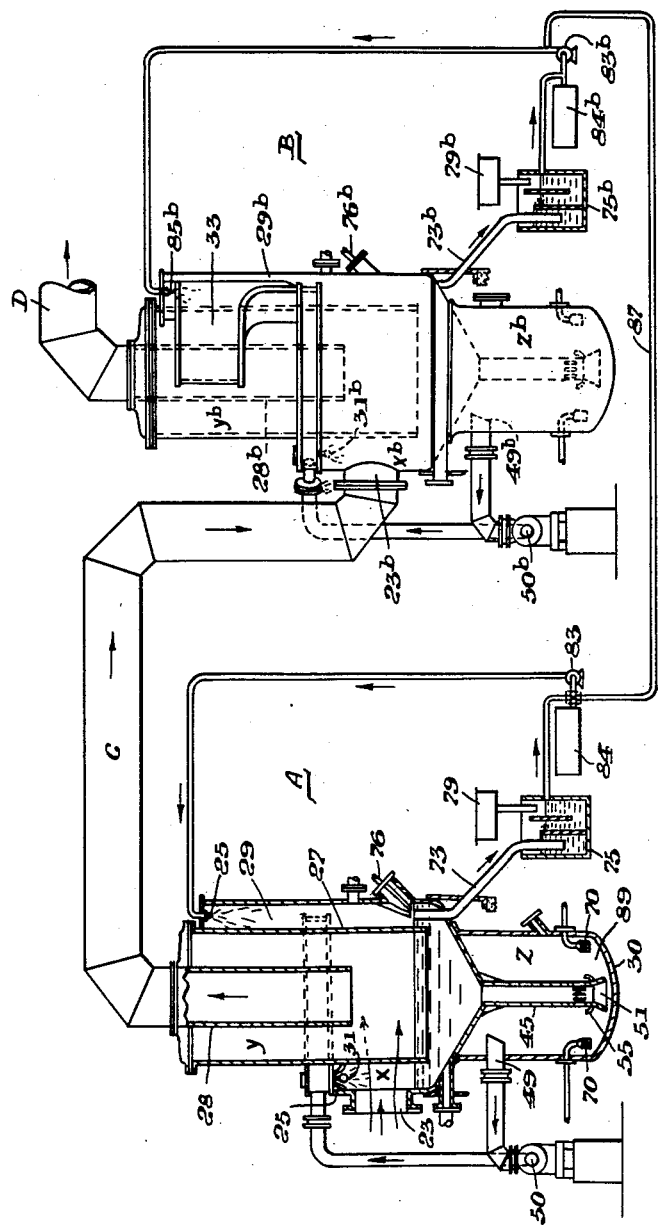
INVENTOR.
EDWARD J. HELM.
BY
Oscar B Brumback
his ATTORNEY

2,921,837
PRODUCTION OF DIAMMONIUM PHOSPHATE FROM COKE OVEN GAS

Edward J. Helm, Pittsburgh, Pa., assignor to Koppers Company, Inc., a corporation of Delaware Application February 21, 1957, Serial No. 641,682

6 Claims. (Cl. 23—107)

This invention relates generally to the recovery of the ammonia from coke oven gas as crystals of diammonium phosphate.

Diammonium phosphate has been produced heretofore by the direct reaction of pure ammonia as a gas and phosphoric acid as a solution; but attempts to make diammonium phosphate from coke oven gas under practical and economic conditions of operation and ammonia recovery have met with a number of obstacles. One factor contributing to these difficulties is the fact that since the proportion of ammonia in the coke oven gas is usually around 1% by volume, a large volume of gas must be handled to recover a small amount of ammonia. Heretofore, a high acid concentration, that is a low pH value, has been required to remove a major percentage of the ammonia from the gas; and as a result, appreciable quantities of monoammonium phosphate were also formed. Monoammonium phosphate is not a desired product because its nitrogen content is too low for use as a fertilizer. On the other hand, when a low acid concentration was used, that is when the pH value was raised to a value such as to give the desired diammonium phosphate as a product, the loss of ammonia in the form of ammonia not absorbed from the gas, was so great as to create problems of air pollution or corrosion and other troublesome conditions in the equipment which followed the absorption step.

An object of the present invention, therefore, is to provide a novel process for the recovery of ammonia from coke oven gas as diammonium phosphate.

Another object of the invention is to provide a novel process wherein the ammonia from coke oven gas is substantially all recovered as diammonium phosphate, the process utilizing a series of absorbers.

The present invention contemplates a process wherein the coke oven gas is first contacted with a solution having crystals of diammonium phosphate suspended therein and having a free acid content which is regulated to maintain the phosphate as the diammonium phosphate salt so that as the solution removes the ammonia from the gas to form diammonium phosphate and reaches a state of supersaturation whereupon the solution is contacted with a bed of previously formed crystals to release the supersaturation by deposition of the excess diammonium phosphate on these crystals, and thereafter the gas which still contains some ammonia is contacted with a second solution unsaturated with respect to its phosphate content and has a free acid content higher than the first solution to remove substantially all the ammonia from the gas; the make-up acid required for the system being divided between the first and second solutions as required to maintain the desired pH in each solution, and the second solution being fed to the first solution for recovery of its ammonium phosphate content in the form of diammonium phosphate.

The above and further objects and novel features of the invention will appear more fully from the detailed description when the same is read in connection with the accompanying drawing. It is to be expressly understood, however, that the drawing is not intended as a definition of the invention but is for purposes of illustration only.

The single sheet of drawing schematically illustrates apparatus for carrying out the present invention.

The apparatus for carrying out the invention is illustrated in the drawing as comprising a pair of absorbers or saturators A and B connected by a conduit C for passage of the coke oven gas in series through the system. Saturator A advantageously may be a crystal-producing apparatus of the type described in Van Ackeren Patent No. 2,671,011. For purposes of illustration, saturator A is shown as a sectional view. As is described in detail in the afore-mentioned Patent No. 2,671,011, such a saturator comprises an absorber X, a mist eliminator Y, and a crystallizer Z. The space between the outer shell 25 of the saturator and an inner member 27 constitutes the absorber X, the space between member 27 and an inner pipe or flue 28 constitutes the mist eliminator Y, and the space enclosed by shell 30 constitutes the crystallizer Z.

The coke oven gas supplied to inlet 23 of saturator A flows through an absorption zone 25 around member 27 and to the lower end of riser 29 by way of two parallel paths; one path of flow being in a clockwise direction around member 27 and the other path being in a counter-clockwise direction. The flow through these paths is extremely turbulent because of the relatively high rate of flow and because of the constantly changing path of flow due to the curvature of the absorption zone. In passing through the absorption zone, the gas is intimately contacted with liquid sprayed from nozzles 31 which are uniformly distributed over the entire length of absorption zone 25 and which provide a dense spray that completely fills the absorption zone.

After the gas reaches the lower end of riser 29, the gas flows up the riser and discharges through a horizontal passage similar to passage 33 of absorber B at a high velocity and tangentially into the chamber between member 27 and pipe 28 which forms the mist eliminator Y. As a result, the gas spirals within this chamber and around pipe 28 at a high rate of speed, and any liquid which is entrained by the gas is hurled against member 27 by centrifugal force and thereby removed from the gases. This liquid drains down the walls of member 27 and into the bath below. Although the gas loses its velocity as it moves downwardly and turns to flow upwardly through pipe 28, the gas is substantially free of entrained liquid by the time the gas enters the pipe.

The solution which is sprayed into the absorber 25 by nozzles 31 is in a substantially saturated condition as it leaves the nozzles; but due to the intimate contact with the gas in zone 25, the solution reaches a supersaturated condition by absorption of ammonia from the gas. This sprayed liquid is collected at the lower portion 43 of the absorber 25 and, as a supersaturated solution, is continuously flowed by way of pipe 45 into crystallizer bowl Z. The supersaturation of the liquid is released, or the liquid is desupersaturated, in the crystallizer Z upon its contact with previously formed crystals therein; and the saturated liquid which remains is removed from the crystallizer by way of suction head 49 and pump 50 and returned to sprays 31.

A major portion of the liquid, which flows through pipe 45 into the crystallizer, flows out through the lower end 51 of the pipe; and a minor portion of the liquid flows out through the openings 53. While this major portion impinges on the bottom of the crystallizer, and flows radially outwardly and upwardly in the regions adjacent the wall of the crystallizer, deflectors 55 cause the minor portion to flow radially upwardly in the region adjacent the pipe. The upward flow of this minor portion in the central part of crystallizer Z prevents the major portion from flowing upwardly in the outer portion of the crystallizer and then flowing downwardly in the region adjacent pipe 45. Accordingly, the movement of liquid at any given level in the crystallizer is upwardly at a substantially uniform rate.

The contact of the liquid, which is discharged from the pipe 45 into the lower portion of crystallizer Z, with the crystals held in suspension in the bottom portion of the crystallizer releases the supersaturation of the liquid (i.e., the liquid is desupersaturated). The excess diammonium phosphate is deposited on these crystals and causes the crystals to grow in size until they gravitate to the lower portion of the bowl where they are removed through the suction heads 70. Since the upward flow of the liquid is at a substantially uniform rate throughout any given part of the crystallizer, the crystals settling to the lower part of the crystallizer are of substantially uniform size; and a relatively large portion of the crystals withdrawn through the suction heads 70 are of the preferred large size.

The solution in portion 43 of the absorber X is maintained at a level just low enough to seal the mist eliminator Y from the absorber X. To this end, an overflow pipe 73 is provided to drain into a conventional tar skimmer 75. A hot water pipe 76 is provided to keep pipe 75 from becoming clogged. New acid to replace the acid which was spent in absorbing the ammonia is also added to the tar skimmer from a suitable storage tank 79. The overflow from tar skimmer 75 is fed to pump 83 and mother liquor tank 84, and pump 83 supplies solution to the spray 85 in upright portion 29. For a reason that will later become apparent, the output side of pump 83b of absorber B is connected by line 87 to the input side of pump 83 of absorber A.

Saturator B may be generally similar to saturator A having an absorber XB, a mist separator YB, and a portion ZB similar to crystallizer Z of saturator A. However, since the solution in saturator B is maintained in an unsaturated condition, no crystals form in chamber ZB, which merely acts as a reservoir. Solution from reservoir ZB is forced by way of nozzles 49B and pump 50B to sprays 31B where the solution is sprayed in intimate contact with the gas passing through to riser 29B from inlet 23B and through horizontal member 30 into the mist eliminator YB where any entrained liquid is removed from the gas. The gas then exits by way of duct D. Overflow 73B maintains a predetermined level in absorber XB by draining the excess liquid to a conventional tar skimmer 75B. Make-up acid is added from a suitable acid storage tank 79B to the solution in tar skimmer 75B and the overflow passed to pump 83B and storage tank 84B. Pump 83B forces the solution to spray heads 85B. Thus, saturator B may be generally similar to saturator A except that crystals are not formed in the saturator B as in saturator A.

In accordance with the present invention, the coke oven gas containing ammonia enters the first absorber A at inlet 23 and flows through the absorption zone X around member 27 to the lower end of riser 29. In this absorption zone, the coke oven gas is contacted with a spray solution which is saturated as to its content of diammonium phosphate and has small crystals of diammonium phosphate in suspension and which has a free acid content controlled to maintain a pH in the range of 6.0 to 7.0, and preferably in the range of 6.5 to 6.7. At these pH values, diammonium phosphate will be formed as the solution absorbs the ammonia constituent of the coke oven gas. As the sprayed solution falls through the absorption zone and the ammonia is removed from the coke oven gas, the solution becomes supersaturated with diammonium phosphate. This solution is collected at the lower portion 43 of absorption chamber X and flowed through pipe 45 into the bottom of crystallizer Z. The solution then flows upwardly through crystallizer Z; and the excess diammonium phosphate is deposited on these crystals as the solution contacts the bed of previously formed crystals therein.

As the crystals of diammonium phosphate become heavy enough to gravitate to the bottom, they are removed through suction nozzles 70 and sent to a conventional centrifuge (not shown) where they are separated from the mother liquor. The crystals are subsequently dried in a conventional manner and sold as crystalline diammonium phosphate. The filtrate is returned (by means not shown) to the collected liquor at the lower portion 89 of the absorption chamber.

The gas, which leaves saturator A at pipe 28, still contains approximately 5 to 15 percent of the ammonia originally in the gas. This gas enters the second saturator B at inlet 23B and flows through the absorber XB therein to the riser 29B. In this absorber, the gas is contacted with a second spray having a pH value in the range of 3.5 to 5.5 and preferably in the range of 4.2 to 4.4. The gas which passes up riser 29B to the mist eliminator YB and on out to the outlet D will contain less than one percent and preferably less than one-half percent of the ammonia originally in the gas. The solution in the second saturator is maintained unsaturated with respect to its salt content to prevent precipitation of the monoammonium phosphate. To this end, water, by way of line 76B is added to the second saturator in a quantity necessary to maintain the solution unsaturated as to its content of ammonium phosphate. The solution is transferred from the second saturator B by way of line 87 to the first saturator A at a rate equivalent to the absorption of ammonia in the second saturator. The overall acid balance of the system is maintained by adding about 85 to 95% and preferably about 90%, of the make-up phosphoric acid to saturator A and about 5 to 15%, and preferably about 10%, of this acid to saturator B. In this manner, the quantity of phosphoric acid added to saturator B is equivalent to that quantity taken up in the absorption of ammonia from the coke oven gas therein.

In a typical operation of the two absorbers A and B according to the present invention, 2.2 pounds of diammonium phosphate were produced per 1000 cubic feet of dry gas entering the first absorber when this gas contained 298 grains of ammonia per 100 cubic feet of gas. The gas leaving the first absorber and entering the second absorber was found to contain 40 grains of ammonia per 100 cubic feet of gas, and the gas leaving the second absorber to contain 2 grains of ammonia per 100 cubic feet of gas. The liquids in both absorbers were maintained at a temperature of 47.5° C.; and liquid in the first absorber was maintained at a pH value of 6.6, and the liquid in the second absorber at a pH value of 4.3. In adding the make-up acid to replace the acid taken up by the ammonia, 90% was added to the first absorber and 10% to the second absorber. The solution of the first absorber A contained a concentration of solids of 117 pounds of solid per 100 pounds of water and the solution in the second absorber B contained a concentration of 76.8 pounds of solids per 100 pounds of water.

To maintain the system in balance, solution was transferred to absorber A from absorber B and make-up acid was added to both absorber A and B, at the rates necessary (a) to maintain substantially constant the solids content and pH of the solution in each absorber and (b) to keep the water added to each absorber equal to or less than the water evaporated into the gas by the heat of reaction of the ammonia absorbed from the gas with the phosphoric acid in the solution in each chamber. Using the phosphoric acid as a base, 1.58 pounds of water were transferred from the second absorber to the first absorber per pound of phosphoric acid transferred. The phosphoric acid used was 75% acid and 25% water, so that the water added to the first absorber with the solution transferred from the second absorber was 1.58×.10= 0.158 pound of water per pound of total acid. The water included with the acid (90% of total acid) added directly to the first absorber was 25/75×.90=0.30 pound of water per pound of total acid. The total water added to the first absorber, exclusive of wash water in the centrifugal drier and water added periodically to dissolve salt encrustations, therefore was 0.30+0.158=0.458 pound per pound of total phosphoric acid added to the entire system. This corresponded to 0.51 pound of water to be evaporated into the gas in the first absorber A per pound of acid reacting with ammonia in the first absorber.

So as to maintain the necessary water balance in the system and at the same time maintain the required pH ranges in the two absorbers while also maintaining a saturated solution in the second absorber B, and saturated or supersaturated solution in the first absorber A, it is necessary to remove substantially all of the liquor spray from the gas passing from the first absorber A to the second absorber B. Failure to provide for substantially complete removal of the entrained spray carried by the gas from the first absorption zone will result in excessive mixing of the solutions from the two absorbers, and make it difficult, if not impossible, to maintain the required conditions of solids concentration and pH in both parts of the system. The inclusion of an efficient mist separator for the gas leaving the first absorption zone, therefore, is an important part of this invention.

The foregoing has presented a novel process for recovering the ammonia from coke oven gas as crystals of diammonium phosphate. The recovery of ammonia is substantially complete, the process is continuous, the pH value of the solutions may vary within predetermined limits, and the diammonium phosphate produced is substantially free of monoammonium phosphate.

It is to be understood that the foregoing is by way of illustration and that changes and modifications may be made within the scope of the claims without departing from the spirit of the invention.

What is claimed:

1. A process for recovering the ammonia from coke oven gas as crystals of diammonium phosphate which comprises contacting said coke oven gas in sequence with first and second solutions, said first solution being saturated as to its content of diammonium phosphate and containing free phosphoric acid at a pH value of from 6.0 to 7.0 so as to be conducive to the formation of diammonium phosphate by absorption of ammonia from said gas whereby the solution becomes supersaturated with diammonium phosphate, withdrawing said supersaturated first solution from contact with said gas and contacting said supersaturated first solution with previously formed crystals of diammonium phosphate whereby the supersaturation of said first solution is released by the deposition of the excess diammonium phosphate on the crystals so as to leave the solution substantially saturated, and returning said saturated solution into contact with said coke oven gas as said first solution, said second solution being unsaturated as to its content of ammonium phosphate and containing free phosphoric acid of a strength greater than said first solution and of a pH value of 3.5 to 4.5 so as to be conducive to the substantially complete absorption of ammonia from the gas, adding water to said second solution to maintain the unsaturated condition as ammonia is absorbed from the gas, and flowing said second solution to said first solution to replace water evaporated from said first solution by the contact of said solution with said gas.

2. A process for recovering the ammonia from coke oven gas as crystals of diammonium phosphate which comprises contacting said coke oven gas separately and sequentially with first and second solutions, said first solution being saturated with diammonium phosphate and containing free phosphoric acid at a pH value of from 6.0 to 7.0 such that the ammonia of said gas reacts with the acid from said first solution to form diammonium phosphate, whereby the first solution becomes supersaturated, withdrawing said first supersaturated solution from contact with said gas and contacting said first supersaturated solution with previously formed crystals of diammonium phosphate whereby the supersaturation of said first solution is released by depositing the excess diammonium phosphate on the crystals thereby leaving a substantially saturated solution, returning the thus formed substantially saturated solution as said first solution into contact with said coke oven gas, said second solution being unsaturated with respect to its ammonium phosphate content and containing free phosphoric acid at a pH value of from 3.5 to 4.5 so that the ammonia from said gas is absorbed substantially completely, adding water to said second solution to maintain the solution unsaturated as the ammonia is absorbed from the gas, and flowing said second solution to said first solution to replace water evaporated from said first solution by contact of said first solution with said gas.

3. A process for recovering the ammonia from coke oven gas as crystals of diammonium phosphate which comprises spraying said coke oven gas with a first solution which is saturated with diammonium phosphate and containing free phosphoric acid at a pH value of from 6.0 to 7.0 so that the ammonia reacts with the acid to form diammonium phosphate whereby the solution becomes supersaturated with diammonium phosphate, withdrawing said supersaturated first solution from contact with said gas and contacting said first solution with previously formed crystals of diammonium phosphate to release the supersaturation by depositing the excess diammonium phosphate on the crystals so as to leave the solution substantially saturated, returning the thus formed substantially saturated solution as the first solution for contact with said coke oven gas, thereafter spraying said gas with a second solution, said first solution inherently being incapable of removing all the ammonia from the coke oven gas, said second solution being unsaturated with respect to its ammonium phosphate content and having phosphoric acid at a pH value of 3.5 to 5.5 so as to be conducive to the substantially complete absorption of the ammonia of the gas, adding water to said second solution to maintain the unsaturated condition as ammonia is absorbed from the gas, and flowing said second solution to said first solution to replace water evaporated from said first solution by the contact of the first solution with said gas.

4. A process for producing diammonium phosphate from the ammonia of coke oven gas which comprises contacting said coke oven gas with a first solution that is saturated as to its content of diammonium phosphate and contains free phosphoric acid so as to have a pH value of from 6.0 to 7.0 so as to be conducive to the formation of diammonium phosphate, whereby the solution absorbs ammonia from said gas and becomes supersaturated with diammonium phosphate, removing said supersaturated first solution from contact with said gas and contacting said supersaturated first solution with previously formed crystals of diammonium phosphate whereby the supersaturation of said first solution is released by the deposition of the excess diammonium phosphate on the crystals so as to leave the solution substantially saturated, and returning said saturated solution into contact with said coke oven gas as said first solution, withdrawing said gas from contact with said first solution, removing any of said first solution from said gas, thereafter contacting said gas with a second solution which is unsaturated as to its content of ammonium phosphate and contains free phosphoric acid of a pH value of from 3.5 to 5.5 so as to be conducive to substantially complete absorption of ammonia from said gas, adding water to said second solution to maintain the unsaturated condition as ammonia is absorbed from the gas, and flowing said second solution to said first solution to replace water evaporated from said first solution by the contact of said solution with said gas.

5. A process for producing diammonium phosphate from the ammonia of coke oven gas which comprises contacting said coke oven gas with a first solution which is saturated with diammonium phosphate and contains free phosphoric acid at a pH value of from 6.0 to 7.0 so that the ammonia of said gas reacts with the acid from said first solution to form diammonium phosphate to supersaturate said first solution, removing the supersaturated first solution from contact with said gas and contacting said supersaturated first solution with previously formed crystals of diammonium phosphate whereby the supersaturation of said first solution is released by depositing the excess diammonium phosphate on the crystals thereby leaving a substantially saturated solution, returning said substantially saturated solution as said first solution into contact with said coke oven gas, removing said gas from contact with said first solution, thereafter contacting said gas with a second solution which is unsaturated with respect to its ammonium phosphate content and contains free phosphoric acid at a pH value of 3.5 to 5.5 so that the ammonia from said gas is absorbed substantially completely, adding water to said second solution to maintain the solution unsaturated as the ammonia is absorbed from the gas, and flowing said second solution to said first solution to replace water evaporated from said first solution by contact of said first solution with said gas.

6. A process for producing diammonium phosphate from the ammonia of coke oven gas which comprises spraying said coke oven gas with a first solution which is saturated with diammonium phosphate and contains free phosphoric acid at a pH value of from 7.0 to 6.0 such that the ammonia reacts with the acid to form diammonium phosphate whereby the solution becomes supersaturated with diammonium phosphate, contacting said first solution with previously formed crystals of diammonium phosphate so as to deposit the excess diammonium phosphate on the crystals so as to leave the solution substantially saturated, returning said substantially saturated solution as the first solution for contact with said coke oven gas, removing the spray which may tend to be carried by said gas, said first solution inherently being incapable of removing all the ammonia from the coke oven gas, so that a substantial amount of ammonia remains in said gas, thereafter spraying said gas with a second solution which is unsaturated with respect to its ammonium phosphate content and has phosphoric acid to provide a pH value of from 3.5 to 4.5 so as to be conducive to the substantially complete absorption of the remaining ammonia of the gas, adding water to said second solution to maintain the unsaturated condition as ammonia is absorbed from the gas, and flowing said second solution to said first solution to replace water evaporated from said first solution by the contact of the first solution with said gas.

References Cited in the file of this patent
UNITED STATES PATENTS

| | | |
|---|---|---|
| 2,033,389 | Moose | Mar. 10, 1936 |
| 2,040,563 | Phillips | May 12, 1936 |